Figure 1:
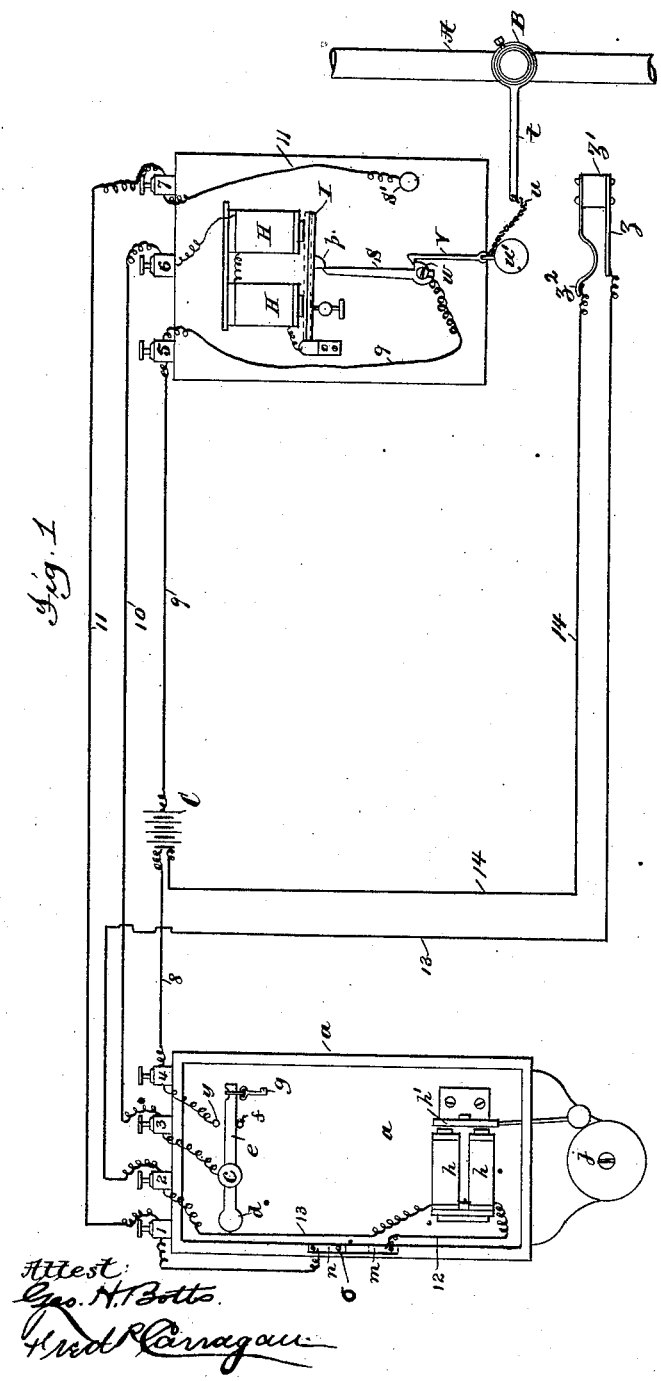

(No Model.) 3 Sheets—Sheet 1.

L. WEIL.
ELECTRICAL METHOD OF AUTOMATICALLY CONTROLLING THE SUPPLY OF WATER OR GAS.

No. 381,866. Patented Apr. 24, 1888.

Attest:
Geo. H. Botts.
Fred R. Carragan.

Inventor:
Leopold Weil.
By ___
Atty.

(No Model.) 3 Sheets—Sheet 2.
L. WEIL.
ELECTRICAL METHOD OF AUTOMATICALLY CONTROLLING THE SUPPLY OF WATER OR GAS.
No. 381,866. Patented Apr. 24, 1888.
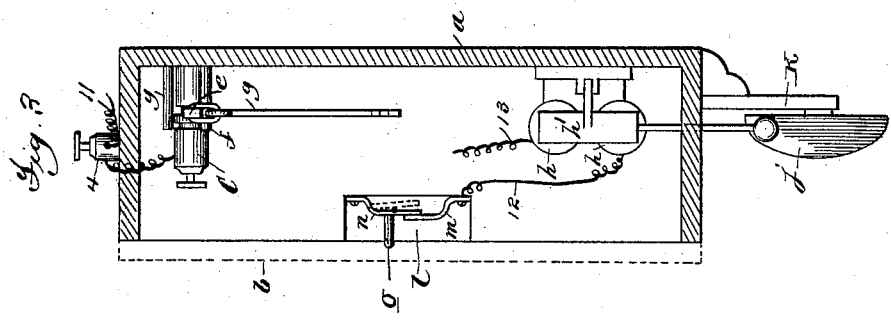
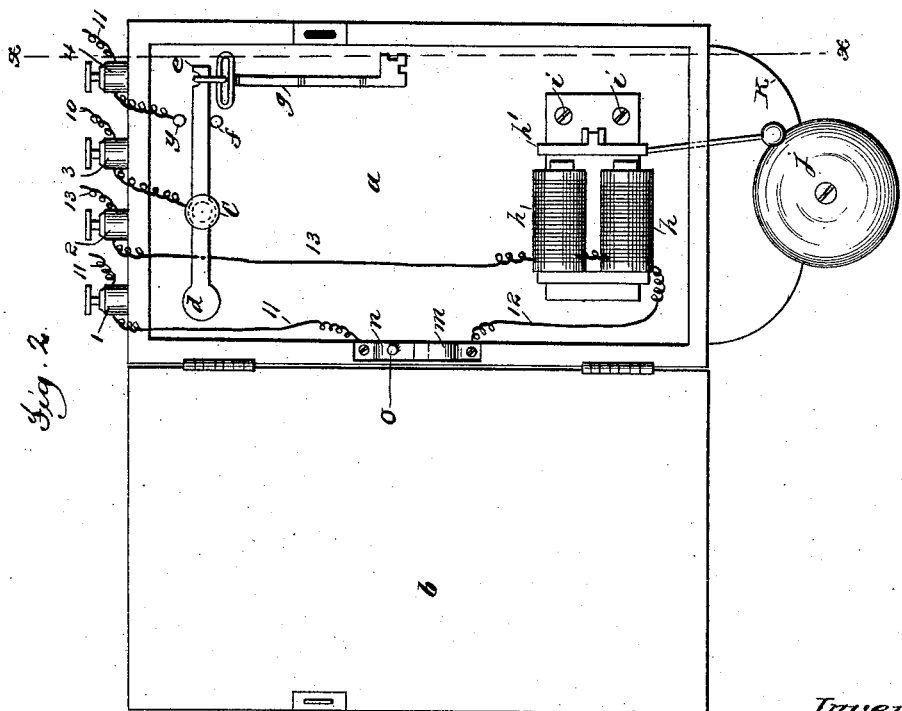

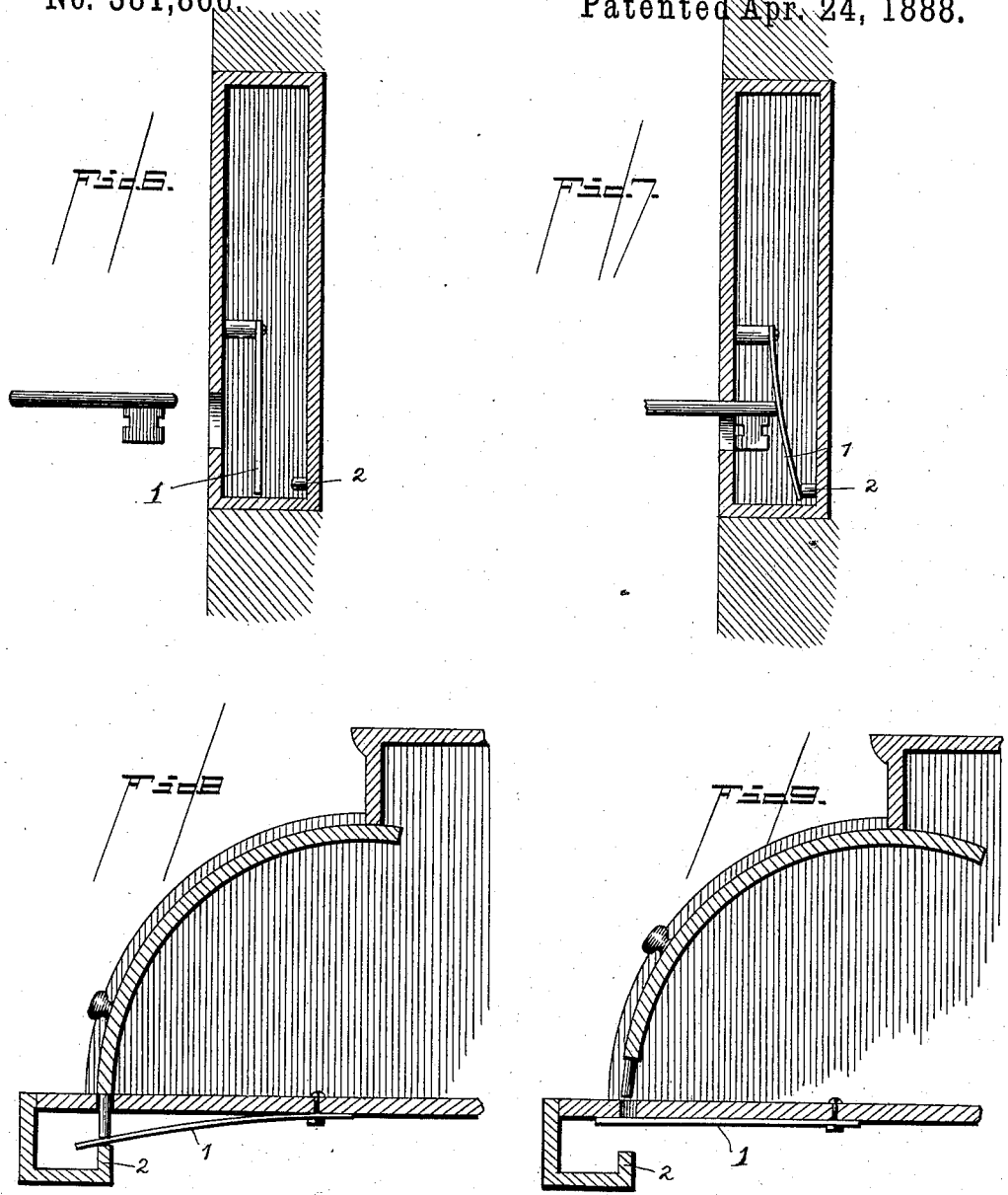

UNITED STATES PATENT OFFICE.

LEOPOLD WEIL, OF NEW YORK, N. Y.

ELECTRICAL METHOD OF AUTOMATICALLY CONTROLLING THE SUPPLY OF WATER OR GAS.

SPECIFICATION forming part of Letters Patent No. 381,866, dated April 24, 1888.

Application filed July 22, 1887. Serial No. 244,993. (No model.)

*To all whom it may concern:*

Be it known that I, LEOPOLD WEIL, a citizen of the United States, residing at New York city, in the county of New York and State of New York, have invented a certain new, useful, and Improved Electrical Method of Automatically Controlling the Supply of Water or Gas, of which the following is a full, clear, and exact description.

This invention relates to an electrical method or system for controlling the supply of water or gas in a building so that the supply of either or both will be automatically shut off when the building is closed at night, or whenever desirable, the object being, primarily, to absolutely prevent overflows or leakage of water, or leakage and waste of gas; secondly, the object is to control the supply by a cut-off valve or valves automatically electrically operated so as to close the supply pipe or pipes when some act is done which must of necessity be done in order to close the building when business is suspended for the day—for instance, when the entrance door-key is removed from a hook or other support, adapted, when relieved of the weight of the key, to move so as to make contact or break the circuit, or the locking of a desk arranged in the circuit, or some similar act which operates to close or open the circuit. Taking the water-supply as an illustration, it is ordinarily the practice in business-houses to turn the water off when the building is closed for the day, and this is almost always left to the porter or some other person whose duty it is to close the building, and attention to it therefore depends upon the thoughtfulness of such person. In cases where there are several tenants the one whose duty it is to turn off the water at night is responsible for damage, should any occur, in case the water has not been turned off and a leak or overflow occurs. I therefore seek by this invention to guard against negligence or carelessness in failing to shut off the supply; and my invention therefore consists in an electrical method or system of automatically controlling the supply of water or gas, which consists in electrically actuating a cut-off valve by the mechanical movement of some part or parts in the circuit.

My invention also consists in the combination, in an electric circuit properly provided with a generator of electricity and electro-magnets, of a cut-off valve or valves arranged in this circuit and means for closing the circuit to operate the valve or valves, which, briefly stated, consist in making contact by the removal of a weight from one end of a circuit-controlling device—for instance, the removal of a key from one end of a weighted lever, whereby contact is made and the circuit opened or closed, or some similar predetermined mechanical movement, which must take place in closing the premises.

My invention also includes an alarm which is automatically sounded after the valve or valves are operated, means for breaking the bell-circuit without disturbing the main circuit, and a novel arrangement of the main circuit so that it will remain closed until the weight or key is returned to its support, or, in other words, until the action which closed the circuit has been reversed.

My invention also comprises certain novel details in the construction and arrangement of the several parts, all as hereinafter fully described, and pointed out in the claims.

In the accompanying drawings I have shown one example of the construction and operation of my invention, as this will be sufficient to enable any person skilled in the art to practice the same, modifications in the construction and arrangement and duplication of the parts being merely matters of mechanical detail.

Like parts in the several figures of the drawings are designated by similar letters of reference.

Figure 4:
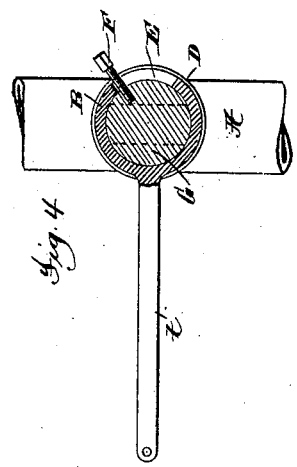

In Figure 1 I have shown the system arranged to operate a single supply-pipe, and this figure illustrates a diagrammatic view of the main circuit, bell-circuit, and cut-off valve, and the box containing the main-circuit-controlling device, the alarm-bell, and means for breaking the bell-circuit. Fig. 2 is a plan view of this box with the door open; and Fig. 3 is a central vertical section thereof, taken on the line $x\ x$, Fig. 2. Fig. 4 is a cross-section of the cut-off valve, and Fig. 5 a central vertical section thereof. Figs. 6, 7, 8, and 9 represent modifications of my invention.

The box $a$ is provided with a hinged door, $b$, and a series of binding-posts, 1 2 3 4. Arranged in the box is a weighted lever, which I term the "main-circuit-controlling device." This lever is pivoted at $c$, its end $d$ being weighted and its end $e$ formed in the shape of a hook.

$f$ designates a stop-pin, against which the lever rests when a key, $g$, or other weight sufficient to counterbalance the weighted end $d$ is hung on the hook-shaped end $e$. In the lower part of the box an electro-magnet, $h\ h$, is suitably supported, as by screws $i\ i$, and below the box an alarm-bell, $j$, is suitably supported, as by a bracket, $k$. In one edge of the box—preferably that edge to which the door is hinged—a recess, $l$, is formed, and in this recess the device for breaking the bell-circuit is contained. This device consists of two flat springs, $m\ n$, normally in contact, and the spring $m$ overlapping the spring $n$. The spring $n$ is provided with a projecting pin, $o$, against which the door bears when closed, thus forcing the spring $n$ farther into the recess $l$ and out of contact with the spring $m$. The electric devices by means of which the cut-off valve is operated consist of a battery and trip apparatus. This trip apparatus is arranged as follows:

H H is an electro-magnet, whose armature I is normally in the position shown by the full lines. This armature carries a catch, $p$, which in the normal position of the armature I engages with the lever $s$. A designates the water-supply pipe, which is provided with a cut-off valve, B, operated by a lever, $t$. Attached to the arm of this lever is a weighted chain, $u$, carrying a hook, $v$, which engages a detent, $w$, on the lever $s$. Binding-posts 5, 6, and 7 are attached to the frame or stand of the trip apparatus.

The electrical connections are as follows: The binding-post 4 is connected to the battery C and to the stop-pin $y$ by wire 8. From the battery a wire, 9, is run through binding-post 5 to the lever $s$, which is in metallic connection with the armature I. A wire, 10, runs from the circuit-controlling device through binding-posts 3 and 6 to the electro-magnet H H. From the spring $n$ a wire, 11, runs through binding-posts 1 and 7 to the contact-point $s'$, then by way of lever $s$ and binding-post 5 to the battery C, and from the spring $m$ a wire, 12, runs to the electro-magnet $h\ h$, and from this magnet a wire, 13, runs through binding-post 2 to the contact-piece $z$, which is a flat piece of metal secured to a block, $z'$, of non-conducting material.

$z^2$ designates a cup-shaped spring-piece of metal, also attached to the block $z'$, and normally held out of contact with the plate $z$. From $z^2$ a wire, 14, runs to the battery C. The main circuit is from the stop-pin $y$ through binding-post 4 to the battery, and from the battery to post 5, thence to lever $s$, thence to the armature I, thence to the electro-magnet H H, thence to the circuit-controlling device through binding-posts 6 and 3. The bell-circuit is from the battery C to the cup-shaped piece $z^2$, (the latter being in contact with plate $z$,) thence from $z$ through binding-post 2 to the electro-magnet $h\ h$, thence to springs $m\ n$, thence from spring $n$ through binding-posts 1 and 7 to the contact-point $s'$, then by way of lever $s$ and binding-post 5 to battery C.

The operation is substantially as follows, viz: When the key $g$ is removed from the lever or circuit-controlling device, the weighted end $d$ moves downwardly and the other end upwardly until the latter rests against the stop-pin $y$, which is a contact-point. This closes the main circuit and energizes the electro-magnet H H, causing it to attract its armature I, thereby releasing the lever $s$, which swings to the right until it makes contact at $s'$, releasing the hook $v$, and the weight $u'$, attached to the chain $u$, falls, moving the lever $t$ sufficiently to operate the valve B to close the supply-pipe. This weight $u'$ drops into the cup-shaped spring-piece $z^2$, forcing the latter into contact with $z$, thus closing the alarm-bell circuit and energizing the electro magnet $h\ h$ until its armature $h'$ is attracted and the alarm sounded. Now both circuits are closed; but as the door $b$ of the box $a$ is closed the door bears against the pin $o$ and forces the spring $n$ into the recess $l$ and away from the spring $m$, thus breaking the bell-circuit.

It will be observed that the bell-circuit will not be closed until the valve has been operated and the supply-pipe closed, and that the bell-circuit will only remain closed while the door $b$ is open. The object of this is to stop the ringing of the bell as soon as the first alarm has given notice that the valve has been operated. When the door is opened again—the next day, for instance—the spring $n$ will assume its normal position in contact with the spring $m$, and the bell-circuit will be closed until the key $g$ is hung on the hook $e$, the valve turned to open the pipe, and the hook $v$ and lever $s$ placed in the position shown in Fig. 1. It will be observed, however, that these parts will not remain in this position unless the key is hung on the hook, because until this is done the main circuit is closed. It is therefore necessary, in order to open the main circuit and thus keep the supply-pipe open, that the action which closed the circuit, as described, be reversed. This is important, because the person who operates the valve to open the supply-pipe must return the key to its proper place, thus leaving the apparatus in condition to operate the valve to shut the supply-pipe when the key is taken at night to close the building. It will also be seen that the apparatus can always be tested to ascertain if all the parts are in adjustment and good condition by opening the door of the box and removing the key from the circuit-controlling device, thus closing both circuits in the manner described. Thus, in the morning, when the box is opened to place the key in its place, the alarm will be sounded the moment the springs $m$ and $n$ come in contact if the apparatus is in working order.

Figure 5:
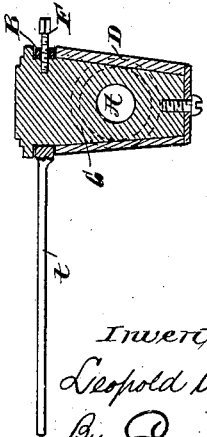

The cut-off valve I prefer to employ is shown in Figs. 4 and 5 of the drawings, and, with a single exception, is of the ordinary construction in common use. This exception consists in forming in the shell D a slot, E, through the upper end of which the pin F, for operating the plug G, extends. When the lever t is moved to turn the plug to close the pipe, it moves freely until the shell has moved the length of the slot and bears against the pin. By this means, when the weight u' drops, the lever, meeting with no resistance until the shell strikes the pin, acquires a certain momentum, which aids it in turning the plug, thus insuring more uniform results in the action of the valve.

In the modification of my invention shown in Figs. 8 and 9 the circuit is operated by the opening or closing of a desk, safe, door, or the like. In this case the circuit is closed when the spring-piece 1 bears against the contact-point 2, and the circuit is open when the spring-piece is forced away from the contact-point when the desk, safe, or door is closed.

In the modification shown in Figs. 6 and 7 the circuit is operated by separating the contact-points 1 2, which is accomplished by the insertion or turning of a key in a lock.

It is obvious that many modifications of my invention may be made without departing from the principal features of improvement, and therefore I do not wish to be limited to any specific form of construction of the circuit-controlling device and its connections. When it is desired to close the supply of water or gas simultaneously by the same mechanical movement of the circuit-controlling device, this can be accomplished by a bell-crank lever operating two valves at the same time or a duplication of trip apparatus and valves, the general features of construction of the several parts and their connection in the circuit being substantially as described.

I wish it also clearly understood that, although the devices hereinabove described, and illustrated in the drawings, are arranged to work when the circuit is closed, they can also, by a simple mechanical change, be arranged to operate when the circuit is opened, and I do not wish to limit myself to either form of arrangement of the several parts.

What I claim as my invention, and desire to secure by Letters Patent, is—

1. A method or system of automatically controlling the supply of water, gas, or other fluid to a building, which consists in automatically operating the circuit-controller for an electrically-controlled valve by a mechanical movement, substantially as described, incidental to the closing of the building, as set forth.

2. The combination, with the cut-off valve for the water, gas, or other fluid-supply of a building, of a controlling-magnet, a mechanism automatically controlled or operated in the performance of some act attendant upon the closing of the building or its equivalent, as described, and an electrical circuit-controller actuated or governed by said mechanism and placed in a circuit leading to said magnet, as and for the purpose described.

3. In an apparatus for controlling the supply of water, gas, or other fluid to a building, a cut-off valve, an electric circuit actuating the same, and a circuit closer or breaker in the form of a device necessarily manipulated in the operation of closing the building, as set forth.

4. The combination, in an apparatus for controlling the supply of water or gas, of a cut-off valve, an electro-magnet or equivalent device controlling said valve, and a circuit-controlling device in the circuit of said electro-magnet automatically actuated by a mechanical operation incidental to the closing of the building, as described.

5. In an apparatus for controlling the supply of water or gas, the combination of a cut-off valve, an electro-magnet or equivalent device controlling said valve, a circuit-controlling lever in the circuit of said electro-magnet, and a removable weight upon said lever, whereby the latter is caused normally to close or open the circuit, and whereby the removal of the weight will permit the lever to reverse its function, as and for the purpose described.

6. In an apparatus for controlling the supply of water, gas, or other fluid, the combination of a cut-off valve, an electro-magnet or equivalent device controlling said valve, a circuit-controlling device in the circuit of said electro-magnet automatically actuated by a mechanical movement incidental to the closing of the building, and an audible-signal device automatically operated by said valve, as and for the purpose described.

7. In an apparatus for controlling the supply of water, gas, or other fluid, the combination of a cut-off valve, an electro-magnet or equivalent device controlling said valve, a circuit-controlling device located in a compartment and automatically actuated by a predetermined mechanical movement, and an audible-signal device actuated by the opening of said compartment, whereby the signal must be made before the circuit-controlling device can be reached, as and for the purpose described.

In testimony whereof I have hereunto set my hand this 19th day of July, A. D. 1887.

LEOPOLD WEIL.

Witnesses:
LEOPOLD GUMPERTZ,
WM. MICHWEKON.